United States Patent [19]

Kadis

[11] Patent Number: 4,688,775
[45] Date of Patent: Aug. 25, 1987

[54] SELF-LUBRICATING DIE CYLINDER

[75] Inventor: Paul M. Kadis, Chardon, Ohio

[73] Assignee: Teledyne Industries, Inc., Brecksville, Ohio

[21] Appl. No.: 830,699

[22] Filed: Feb. 18, 1986

Related U.S. Application Data

[63] Continuation-in-part of Ser. No. 723,036, Apr. 15, 1985.

[51] Int. Cl.⁴ .......................... F16F 5/00; F16F 9/00
[52] U.S. Cl. ...................................... 267/119; 184/18; 267/130
[58] Field of Search ............ 267/119, 130, 113, 64.11, 267/64.14, 64.15, 64.26, 64.28; 188/322.18, 268; 184/5, 18, 6.26, 41, 42, 58, 59, 6.17, 54, 56 A, 55 A, 57; 92/142, 154, 156, 153; 91/46

[56] References Cited

U.S. PATENT DOCUMENTS

| | | | |
|---|---|---|---|
| 918,392 | 4/1909 | Talcott | 184/18 X |
| 1,263,928 | 4/1918 | Ridgway | 184/18 |
| 1,845,933 | 2/1932 | Penberthy | 91/46 |
| 1,960,070 | 5/1934 | Sellers | 184/18 |
| 2,527,657 | 10/1950 | Rowledge et al. | 92/154 X |
| 2,781,632 | 2/1957 | Meijer | 184/6.26 X |
| 2,815,254 | 12/1957 | Soman et al. | 267/119 |
| 2,836,349 | 5/1958 | Scheldorf | 92/156 X |
| 3,947,005 | 3/1976 | Wallis | 267/119 |
| 4,005,763 | 2/1977 | Wallis | 267/119 X |
| 4,044,859 | 8/1977 | Wallis | 184/18 |
| 4,257,254 | 3/1981 | Adamus et al. | 72/432 |
| 4,342,448 | 8/1982 | Wallis | 267/119 |
| 4,423,859 | 1/1984 | Muller | 267/119 |
| 4,447,047 | 5/1984 | Newell | 267/119 X |

FOREIGN PATENT DOCUMENTS 497593  2/1951  Belgium ............................... 184/18

OTHER PUBLICATIONS

Brochure entitled "Super Nitro-Dyne The Original Nitrogen Die System".

Primary Examiner—Douglas C. Butler
Attorney, Agent, or Firm—Tarolli, Sundheim & Covell

[57] ABSTRACT

A press cushion assembly includes a variable volume chamber which is expanded during operation of the press to an open condition and is contracted during operation of the press to a closed condition. During expansion of the variable volume chamber, a flow of lubricating liquid is conducted to the variable volume chamber from a reservoir. At the same time, a flow of gas is also conducted from the reservoir to the variable volume chamber. Upon closing of the press and contraction of the variable volume chamber, a flow of lubricating fluid and gas is conducted from the variable volume chamber back to the reservoir. The cushion assembly may include a manifold plate in which a plurality of piston and cylinder assemblies are mounted. A reservoir disposed in the manifold plate is connected in fluid communication with the piston and cylinder assemblies by a plurality of passages. Check valves may be provided in the passages so that the lubricating fluid can flow in only one direction.

28 Claims, 5 Drawing Figures

SELF-LUBRICATING DIE CYLINDER

BACKGROUND OF THE INVENTION

This application is a continuation-in-part of co-pending U.S. patent application Ser. No. 723,036, filed Apr. 15, 1985 by Paul M. Kadis and entitled "Self-Lubricating Die Cylinder". This application discloses a new and improved method and apparatus for lubricating and cooling a high pressure dynamic seal and cylinder wall in an apparatus which absorbs operating forces during operation of a press.

Cushion assemblies for absorbing operating forces during operation of a press are disclosed in U.S. Pat. Nos. 2,815,254; 4,005,763; 4,257,254; and 4,342,448. Some of these patents disclose the concept of lubricating components of the cushion assembly. Lubricating the components of a cushion assembly will enhance the service life and reliability of the cushion assembly. Lubricating the seals in a cushion assembly is especially beneficial in enhancing the operating life of the cushion assembly.

SUMMARY OF THE PRESENT INVENTION

The present invention provides a new and improved method and apparatus for lubricating components of a cushion assembly which is used in a press to absorb operating forces. Upon operation of the press from a closed condition to an open condition, a variable volume chamber is expanded. As the variable volume chamber is expanded, a flow of gas and lubricating liquid is conducted from a reservoir to the variable volume chamber. The flow of lubricating liquid is sprayed against side surfaces of the piston and cylinder assembly to cool and lubricate components of the piston and cylinder assembly.

As the press is operated from the open condition to the closed condition, the variable volume chamber is contracted. During contraction of the variable volume chamber, a flow of gas and lubricating liquid is conducted from the variable volume chamber back to the reservoir. The flow of lubricating liquid from the piston and cylinder assembly contains heat which is dissipated from the reservoir.

The flow of gas and lubricating liquid from the reservoir to the piston and cylinder assembly is induced by a pressure differential between the expanding variable volume chamber and the reservoir. This pressure differential causes the lubricating liquid to flow through a conduit and to be sprayed over the inner side surfaces of the piston and cylinder assembly. A flow of gas is conducted to the variable volume chamber through a separate passage which is restricted in order to maintain a desired pressure differential between the variable volume chamber and the reservoir. During contraction of the variable volume chamber, a flow of both gas and lubricating liquid is conducted through the restricted passage back to the reservoir.

The present invention can be used with either a manifold type cushion assembly or a cushion assembly having a reservoir which is separate from piston and cylinder assemblies. A manifold type cushion assembly includes a manifold plate upon which the piston and cylinder assemblies are mounted. The reservoir which holds both gas and lubricating liquid is formed in the manifold plate and is connected in fluid communication with the piston and cylinder assemblies.

In another embodiment of the invention, the piston and cylinder assemblies are formed separately from the reservoir. A plurality of fluid conduits conduct gas and lubricating liquid from the reservoir to the piston and cylinder assemblies. In both embodiments of the invention, check valves may be provided in the passages through which lubricating liquid flows to the piston and cylinder assemblies to prevent a backflow of lubricating liquid upon contraction of the variable volume chambers.

Accordingly, it is an object of this invention to provide a new and improved cushion assembly in which a reservoir holds both gas and a lubricating liquid, the lubricating liquid being conducted from the reservoir to a variable volume chamber through one passage and the gas being conducted from the reservoir to the variable volume chamber through another passage during operation of a press from a closed condition to an open condition.

Another object of this invention is to provide a new and improved cushion assembly as set forth in the preceding object and wherein the cushion assembly includes a manifold plate upon which a plurality of piston and cylinder assemblies are mounted and in which the reservoir is disposed.

Another object of this invention is to provide a new and improved method of absorbing press operating forces during operation of the press from an open condition to a closed condition and wherein the method includes conducting a flow of gas and lubricating liquid from a reservoir to a variable volume chamber during operation of the press from a closed condition to an open condition and conducting a flow of gas and lubricating liquid from the variable volume chamber back to the reservoir chamber during operation of the press from the open condition to the closed condition.

BRIEF DESCRIPTION OF THE DRAWINGS

The foregoing and other objects and features of the present invention will become more apparent upon a consideration of the following description taken in connection with the accompanying drawings wherein.

DESCRIPTION OF SPECIFIC PREFERRED EMBODIMENTS OF THE INVENTION

General Description

A known press 10 (FIG. 1) is used to form a workpiece 12. The press 10 includes an upper die shoe 14 having a punch 16 for shaping the workpiece 12. The press 10 also includes a die member 18 mounted on a lower die shoe 20. A pressure pad 22 is disposed within the die member 18 beneath the workpiece 12. A cushion assembly 24 is constructed and operated in accordance with the present invention to absorb forces during operation of the press 10.

Figure 2:
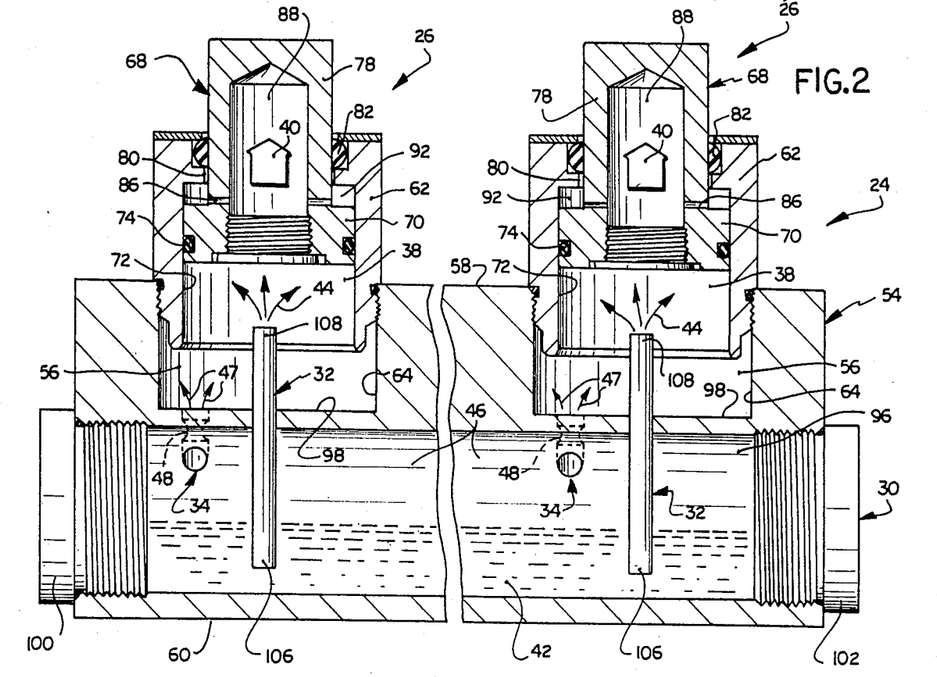
FIG. 2 is a fragmentary sectional view, taken on a reduced scale along the line 2—2 of FIG. 1, schematically illustrating the flow of gas and lubricating liquid in the cushion assembly during operation of the press from a closed condition to an open condition.
Figure 3:
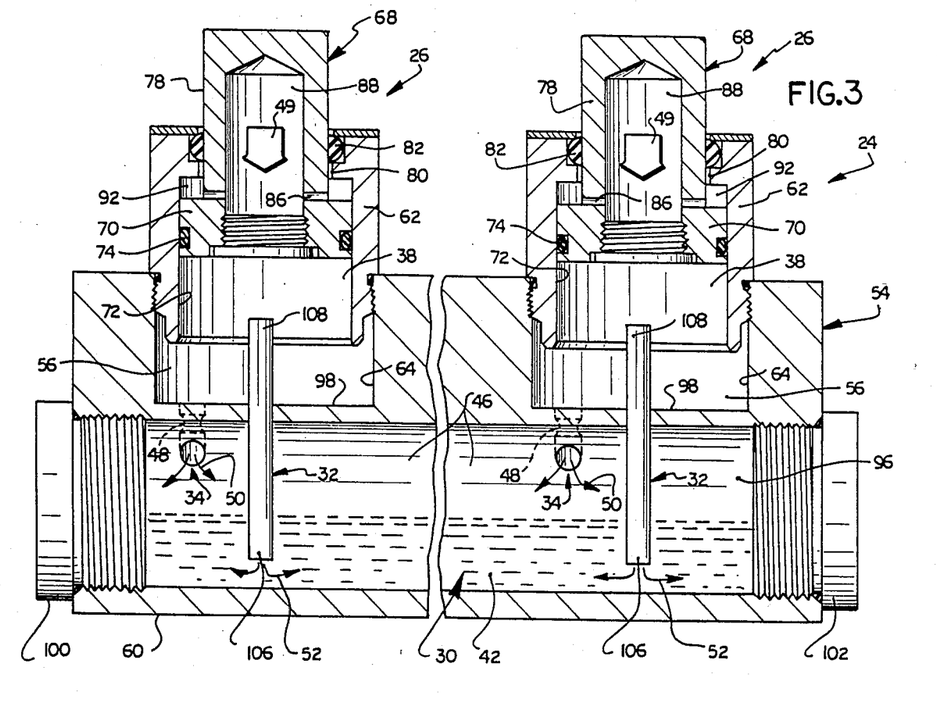
FIG. 3 is a fragmentary sectional view, generally similar to FIG. 2, schematically illustrating the flow of gas and lubricating liquid in the cushion assembly during operation of the press from the open condition to a closed condition.

In the embodiment of the invention illustrated in FIGS. 2 and 3, the cushion assembly 24 includes a plurality of identical piston and cylinder assemblies 26 (FIGS. 2 and 3). Each of the piston and cylinder assemblies 26 is connected in fluid communication with a reservoir 30 by a pair of passages 32 and 34. The tubular conduits forming the passages 32 are disposed in a coaxial relationship with the piston and cylinder assemblies 26.

During operation of the press 10 from a closed condition to an open condition, a variable volume chamber 38 in each of the piston and cylinder assemblies 26 is expanded in the manner indicated by arrows 40 in FIG. 2. As the variable volume chambers 38 are expanded by fluid pressure in the chambers, flows of lubricating liquid are conducted from a body 42 of lubricating liquid in the reservoir 30 upwardly through the passages 32 to the variable volume chambers. The flows of lubricating liquid are discharged from the passages 32 as sprays which have been indicated schematically by the arrows 44 in FIG. 2. Since the passages 32 are coaxial with the piston and cylinder assemblies 26, the sprays of lubricating liquid cover the side surfaces of the variable volume chambers 38 to lubricate the components of the piston and cylinder assemblies 26.

During the flow of lubricating liquid through the passage 32, flows of gas are conducted from a body 46 of gas in the reservoir 30 to the expanding variable volume chambers 38 through the passages 34. These flows of gas have been indicated schematically by arrows 47 in FIG. 2. In order to maintain a pressure differential between the expanding variable volume chamber 38 and the constant volume reservoir 30, restrictions 48 are provided in the passages 34. The restrictions 48 may be either venturis or orifices.

Due to the combined effect of the restrictions 48 and the lubricating liquid in the passages 32, when the press 10 is being opened and the variable volume chambers 38 are being expanded, the fluid pressure in the reservoir 30 will be greater than the fluid pressure in the variable volume chambers 38. Therefore, the relatively high pressure of the body 46 of gas in the reservoir 30 induces flows of gas and lubricating liquid from the reservoir to the relatively low pressure variable volume chambers 38 through the passages 32 and 34. The flows of lubricating liquid through the passages 32 and gas through the passages 34 are maintained as long as the variable volume chambers 38 continue to expand.

Upon operation of the press from an open condition toward a closed condition, the variable volume chambers 38 are contracted in the manner indicated by the arrows 49 in FIG. 3. As this occurs, the fluid pressure in the variable volume chambers 38 increases to a pressure which is above the fluid pressure in the reservoir 30. By this time, small bodies or puddles of excess lubricating liquid will have accumulated at the bottoms of the variable volume chambers 38.

The small bodies of liquid at the bottoms of the chambers 38 are blown or forced from the contracting chambers through the restricted passages 34 back to the reservoir 30 by a flow of gas from the chambers. The combined flows of gas and lubricating liquid from the contracting chambers 38 through the passages 34 have been indicated by arrows 50 in FIG. 3. At the same time, gas will be forced from the variable volume chambers 38 through the passages 32 back to the reservoir 30. The flows of gas from the contracting chambers 38 through the passages 32 have been indicated by arrows 50 in FIG. 3.

Contraction of the variable volume chambers 38 results in both gas and lubricating liquid being forced from the variable volume chambers back to the reservoir 30. This increases the fluid pressure in the reservoir 30 and variable volume chambers 38. The energy which is expanded by increasing the fluid pressure in the reservoir 30 and contracting variable volume chambers 38 results in the absorbing of press operating forces during operation of the press from the open condition to the closed condition.

The service life of the cushion assembly 24 is increased due to the lubricating and cooling effects of the lubricating liquid. Thus, the spray 44 (FIG. 2) of lubricating liquid into the piston and cylinder assemblies 26 provides lubrication between surfaces which move relative to each other. In addition, heat is conducted from the piston and cylinder assemblies 25 to the reservoir 30 by the flow of lubricating fluid from the piston and cylinder assemblies. This heat is dissipated from the reservoir 30 to the environment.

Cushion Assembly—First Embodiment

Figure 1:
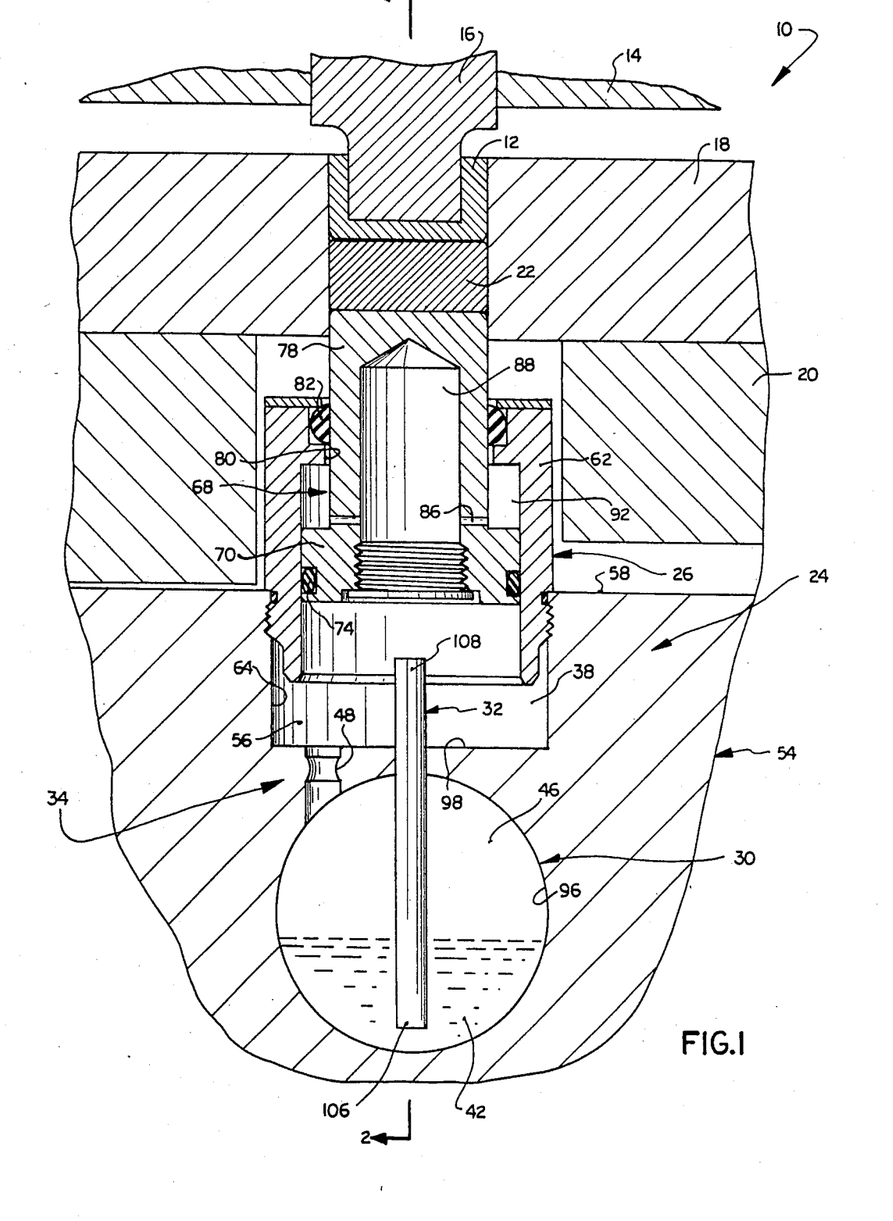
FIG. 1 is a fragmentary sectional view illustrating a press having a cushion assembly which is constructed and operated in accordance with the present invention.

The cushion assembly 24 of FIGS. 1-3 may be considered as being self-contained because the reservoir 30 is disposed in a manifold plate 54 upon which the piston and cylinder assemblies 26 are mounted. Thus, a plurality of cylindrical recesses 56 extend inwardly from a flat upper (as viewed in FIGS. 1-3) major side surface 58 of the manifold plate 54. A flat lower major side surrace 60 of the rectangular manifold plate 54 extends parallel to the upper side 58. Although only two recesses 56 have been shown in FIGS. 2 ad 3, it should be understood that additional recesses can be provided in the manifold plate 54 if desired. Of course, additional piston and cylinder assemblies 26 would be associated with these recesses.

The piston and cylinder assemblies 26 each include a cylindrical cylinder wall 62 having a lower (as viewed in FIGS. 1-3) end portion which extends through an open end of a recess 56. The lower end portions of the cylinder walls 62 have external threads which engage internal threads in a cylindrical side wall 64 of a recess 56. Engagement of the internal and external threads on the recess 56 and cylinder wall 62 holds the cylinder member against movement relative to the manifold plate 54. Of course, other types of mounting arrangements could be used if desired.

A piston 68 (FIG. 1) is slidably mounted in the cylinder wall 62. The piston 68 has a cylindrical head end 70 which slidably engages a cylindrical inner side surface 72 of the cylinder wall 62. An annular high pressure dynamic seal 74 sealingly engages both the inner side surface 72 of the cylinder member 62 and the head end 70 of the piston 68. The high pressure dynamic seal 74 is lubricated and cooled by the lubricating liquid which is sprayed onto the cylinder wall surface 72. Thus, as the piston 68 moves along the cylinder wall 62, the high pressure dynamic seal 74 rides on a film of lubricating oil previously sprayed on the cylinder wall. In addition, the seal 74 is cooled by the lubricating liquid.

In the specific preferred embodiment of the invention illustrated in FIGS. 1-3, the piston 68 has a hollow cylindrical piston rod 78 which extends axially from the head end 70 of the piston through a circular opening 80 in the outer end portion of the cylinder wall 62. An annular rod seal 82 sealingly engages both the piston rod 78 and the cylinder wall 62. A plurality of radial passages 86 connect a generally cylindrical chamber 88 in the piston rod 68 in fluid communication with an annular upper or rod end variable chamber 92.

Upon movement of the piston 68 from a retracted condition to an extended condition during operation of the press from a closed condition to an open condition, the rod end variable volume chamber 92 is contracted and gas is forced from the rod end variable volume chamber into the piston rod chamber 88. Upon movement of the piston 68 from an extended condition to a retracted condition during operation of the press from an open condition to a closed condition, the rod end variable volume chamber 92 expands and fluid flows from the piston rod chamber 88 into the rod end variable volume chamber 92. The construction of the piston and cylinder assembly 26 is the same as is described in U.S. patent application Ser. No. 382,939 filed May 28, 1982 by Balazs et al. for "Die Cylinder Assembly" and will not be further described herein in order to avoid prolixity of description. Of course, other known piston and cylinder assembly designs could be used if desired.

The reservoir 30 includes an elongated cylindrical chamber 96 which extends alongside circular lower end surfaces 98 of a plurality of the recesses 56. Although the reservoir 30 has been shown in FIGS. 1 and 2 as being beneath the bottoms 98 of the recesses 56, the reservoir could project above the bottoms of the recesses if desired. Opposite ends of the reservoir chamber 96 are closed by threaded plugs 100 and 102 (FIGS. 2 and 3) which engage internal threads formed in the manifold plate 54.

The tubular conduits 32 have lower (as viewed in FIGS. 1-3) end portions 106 which are disposed in the body 42 of lubricating liquid in the reservoir 30. The tubular conduits or standpipes 32 have upper end portions 108 which are disposed in the cylinder members 62. The upper ends 108 of the tubular conduits 32 are disposed slightly below the bottoms of the pistons 68 when the pistons are in a fully retracted condition. The upper end portions 108 of each of the conduits 32 could be provided with one or more openings having a desired configuration to promote a spray of lubricating liquid, indicated by the arrows 44 in FIG. 2, against the components of the piston and cylinder assemby 26. The spray of lubricating liquid will wet the lower side surface of the piston 68 and the side wall 72 of the cylinder member 62. This will result in the seal 74 between the head end 70 of the piston 68 and the cylinder member 62 being lubricated and cooled to promote a long seal life.

The amount of force required to move the pistons 68 relative to the cylinder members 62 to contract the variable volume chambers 38 will depend upon the fluid pressure in the variable volume chambers 38 and in the reservoir 30. It is contemplated that this fluid pressure will be varied depending upon the requirements of a particular operation of the press 10. However, it is contemplated that the fluid pressure in the reservoir 30 may be as great as 3,500 psi for some press operations. Of course, the pressure in the reservoir 30 may be less for other press operations. The gas 46 is preferably nitrogen. It should be understood that the foregoing specific pressure and gas have been set forth merely for purposes of clarity of illustration.

The amount of lubricating liquid 42 which is sprayed into the variable volume chambers 38 each time the chambers are expanded will depend, in part, on the diameter of the orifices at the restrictions 48 in the passages 34 and the inside diameters of the tubular conduits 32. The size of the restriction 48 can be calculated in accordance with the formula in the aforementioned U.S. application Ser. No. 723,036, filed Apr. 15, 1985 by Paul M. Kadis. In one specific instance, the restrictions 48 had diameters of approximately 0.125 inches and the tubular members 32 had inside diameters of approximately 0.210 inches. The lubricating liquid 42 was a lube oil sold by Teledyne Hyson of 10367 Brecksville Road, Cleveland, Ohio under the trademark X-P206. Of course, the specific passage dimensions and lubricating liquid will vary depending upon the desired lubricant flow and press operation to be performed.

Cushion Assembly—Second Embodiment

In the embodiment of the invention shown in FIGS. 1-3, the cushion assembly 24 is formed as a self-contained unit. In the embodiment of the invention shown in FIG. 4, the reservoir is separate from the piston and cylinder assembly. Since the embodiment of the invention shown in FIG. 4 is generally similar to the embodiment of the invention shown in FIGS. 1-3, similar numerals will be used to designate similar components, the suffix letter "a" being added to the numerals of FIG. 4 to avoid confusion.

A cushion assembly 24a (FIG. 4) includes a plurality of separate piston and cylinder assemblies 26a and a reservoir 30a. A flow of lubricating liquid is conducted from the reservoir 30a to the piston and cylinder assemblies 26a through conduits or passages 32a. A flow of gas, that is nitrogen, is conducted from the reservoir 30a to the piston and cylinder assemblies 26a through conduits or passages 34a. Restrictions 48a are provided in the conduits 34a.

Figure 4:
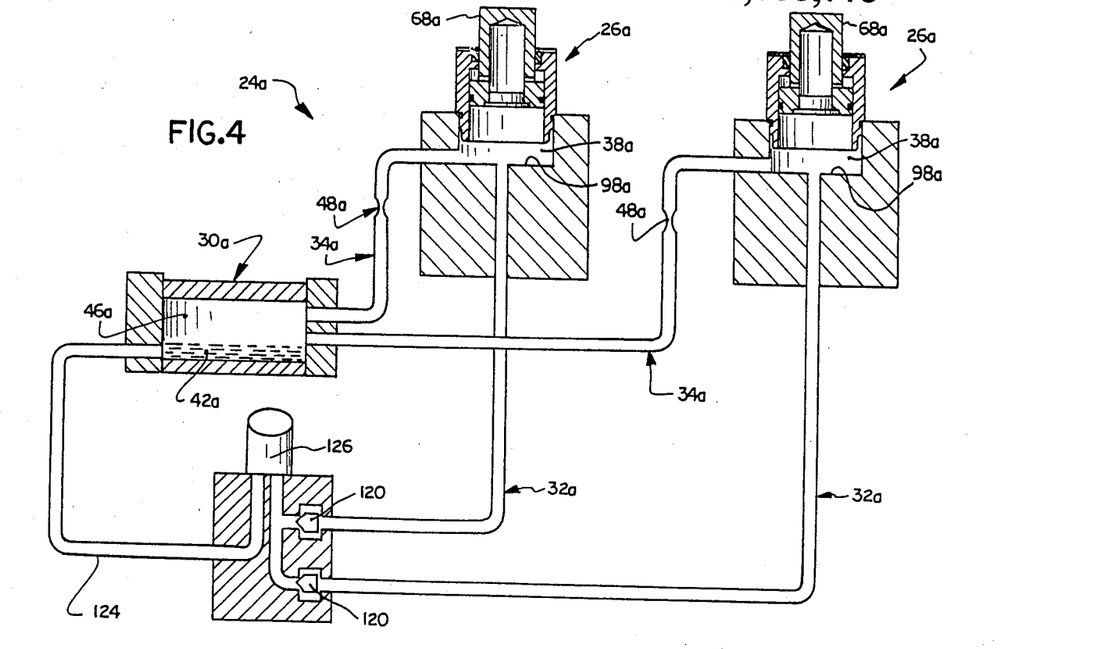
FIG. 4 is a schematic illustration of an embodiment of the cushion assembly in which a reservoir for holding both gas and lubricating liquid is separate from a piston and cylinder assemblies.

In accordance with a feature of the embodiment of the invention shown in FIG. 4, check valves 120 are provided in association with the conduits 32a to block a backflow of lubricating liquid and gas through the conduits 32a. Thus, the lubricating liquid 42a in the reservoir 30a is conducted through a conduit or passage 124 and an optional filter 126 to the check valves 120 before entering the conduits 32a.

Upon operation of the press from an open condition to a closed condition and contraction of the piston and cylinder assemblies 26a, the increased fluid pressure in variable volume chambers 38a of the piston and cylinder assemblies 26a results in a tendency for the lubricating liquid in the conduits 32a to be forced back toward the reservoir 30a. The tendency for the lubricating liquid to flow back toward the reservoir 30a during contraction of the piston and cylinder assemblies 26a is blocked by the check valves 120. Therefore, all of the lubricating liquid which is conducted from the piston and cylinder assemblies 26a back to the reservoir 30a flows through the conduits 34a. Thus, excess lubricating liquid accumulates on the bottom surfaces 98a of the piston and cylinder assemblies 26a. The excess lubricating liquid is blown back to the reservoir 30a by the flows of gas from the contracting piston and cylinder assemblies 26a. Due to the check valves 120, there is no flow of fluid, that is either nitrogen gas or lubricating liquid, through the conduits 32a as the piston and cylinder assemblies 26a contract.

Upon subsequent operation of the press from a closed condition to an open condition, the variable volume chambers 38a are expanded. This results in the fluid pressure in the variable volume chambers 38a being of less than the fluid pressure in the reservoir 30a. The fluid pressure in the reservoir 30a forces the lubricating liquid 42a to flow through the conduit 124, filter 126, check valves 120 and conduits 32a to the variable volume chambers 38a. At the same time, there is a restricted flow of nitrogen gas from the reservoir 30a through the conduits 34a to the variable volume chambers 38a.

Although the check valves 120 have been shown in connection with an embodiment of the invention in which the piston and cylinder assemblies 26a are separate from the reservoir 30a, it is contemplated that check valves could be used in association with the manifold type embodiment of the invention shown in FIGS. 1–3. If this was done, check valves would be provided in the tubular conduits 32. Although two piston and cylinder assemblies 26a have been shown in FIG. 4, either a greater or lesser number of piston and cylinder assemblies could be used if desired.

Cushion Assembly—Third Embodiment

In the embodiments of the invention shown in FIGS. 1–4, the piston and cylinder assemblies 26 and 26a have been illustrated in an upright orientation. In the embodiment of the invention shown in FIG. 5, the piston and cylinder assembly is used in an inverted orientation. Since the embodiment of the invention shown in FIG. 5 is generally similar to the embodiments of the invention shown on FIGS. 1–4, similar numerals will be utilized to designate similar components, the suffix letter "b" being associated with the numerals of FIG. 5 in order to avoid confusion.

Figure 5:
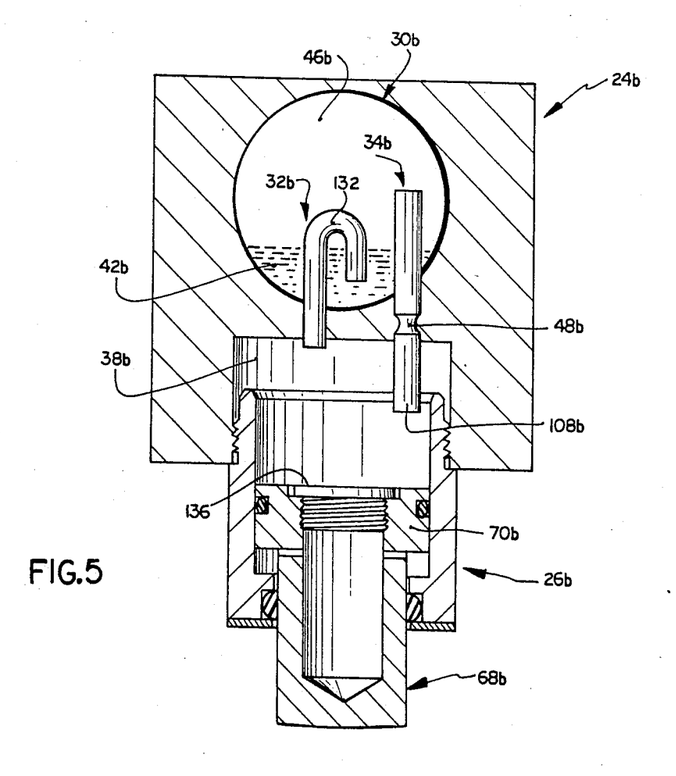
FIG. 5 is a sectional view of an embodiment of the invention in which the cushion assembly is inverted.

The cushion assembly 24b of FIG. 5 includes a piston and cylinder assembly 26b and a reservoir 30b. The reservoir 30b is connected in fluid communication with the piston and cylinder assembly 26b by conduits 32b and 34b. It should be noted that the conduit 32b of the cushion assembly 24b has a curved section 132 which prevents lubricating liquid 42b from flowing from the reservoir 30b to the variable volume chamber 38b under the influence of gravity.

When the press in which the cushion assembly 24b is installed is operated from a closed condition to an open condition, the variable volume chamber 38b is expanded under the influence of gas pressure in the chamber. Thus, the restricted flow of nitrogen gas is conducted from the reservoir 30b through the conduit 34b and restriction 48b to the variable volume chamber 38b. Since the variable volume chamber 34b is expanding, the fluid pressure of the nitrogen gas in the reservoir 30b will be greater than the fluid pressure in the variable volume chamber 38b. Therefore, the lubricating liquid 42b is forced upwardly in the conduit 32b and around the bend 132 so that the liquid flows into the variable volume chamber 38b. The flow of liquid into the variable volume chamber 38b lubricates the components of the piston and cylinder assembly 26b.

Excessive lubricating liquid accumulates in a puddle on a circular upper side surface 136 of the head end portion 70b of the piston 68b. Upon operation of the press from the open condition toward the closed condition, the piston moves upwardly (as viewed in FIG. 5) to contract the variable volume chamber 38b. This forces the gas to flow through the conduits 32b and 34b back to the reservoir 30b. As the puddle of lubricating liquid moves upwardly with the piston head 70b, the puddle submerges or encloses a lower end portion 108b of the conduit 34b. Once this happens, continued upward movement of the piston and contraction of the variable volume chamber 38b forces a flow of the lubricating liquid through the conduit 34b back to the reservoir 30b. It should be noted that the upward movement of the piston 68b stops before the piston head 70b can engage the end portion 108b of the conduit 34b.

Conclusion

The present invention provides a new and improved method and apparatus for lubricating components of a cushion assembly 24 which is used in a press 10 to absorb operating forces. Upon operation of the press 10 from a closed condition to an open condition, a variable volume chamber 38 is expanded. As the variable volume chamber 38 is expanded, a flow of gas 46 and lubricating liquid 42 is conducted from a reservoir 30 to the variable volume chamber. The flow of lubricating liquid 42 is sprayed against the inner side surfaces of the piston and cylinder assembly 26. As the press 10 is operated from the open condition to the closed condition, the variable volume chamber 38 is contracted. During contraction of the variable volume chamber, a flow of gas 46 and lubricating liquid 42 is conducted from the variable volume chamber 38 back to the reservoir 30.

The flow of gas 46 and lubricating liquid 42 from the reservoir 30 to the piston and cylinder assembly 26 is induced by a pressure differential between the expanding variable volume chamber and the reservoir 30. This pressure differential causes the lubricating liquid 42 to flow through a conduit 32 and to be sprayed over the inner side surfaces of the piston and cylinder assembly 26. A flow of gas 46 is conducted to the variable volume chamber 38 through a separate passage 34 which is restricted in order to maintain a desired pressure differential between the variable volume chamber 38 and the reservoir 30. During contraction of the variable volume chamber 38, a flow of both gas and lubricating liquid is conducted through the restricted passage 34 back to the reservoir 30.

The present invention can be used with either a manifold type cushion assembly 24 (FIGS. 1-3) or a cushion assembly 24a (FIG. 4) having a reservoir 30a which is separate from piston and cylinder assemblies 26a. A manifold type cushion assembly 24 includes a manifold plate 54 upon which the piston and cylinder assemblies 26 are mounted. The reservoir 30 which holds both gas and lubricating liquid is formed in the manifold plate 54 and is connected in fluid communication with the piston and cylinder assemblies 26. Since the manifold plate 54 and piston and cylinder assemblies 26 form a unitary structure, this embodiment of the invention may be considered as being self-contained.

In another embodiment of the invention, the piston and cylinder assemblies 26a (FIG. 4) are formed separately from the reservoir 30a. A plurality of fluid conduits or passages 32a and 34a conduct gas and lubricating liquid from the reservoir 30a to the piston and cylinder assemblies. In both embodiments of the invention, check valves 120 may be provided in the passages 32 or 32a through which lubricating liquid flows to the piston and cylinder assemblies 26 or 26a to prevent a backflow of lubricating liquid upon contraction of the variable volume chambers 38 or 38a. The piston and cylinder assemblies 26b (FIG. 5) are mounted in an inverted orientation.

Having described specific preferred embodiments of the invention, the following is claimed:

1. A cushion assembly for use in a press which is operable between open and closed conditions, said cushion assembly comprising a manifold plate having first and second side surfaces disposed on opposite sides of the manifold plate, said manifold plate having surface means for defining a plurality of recesses each of which has an open end in the first side surface of said manifold plate and an end surface disposed between the first and second side surfaces of said manifold plate, a plurality of cylinder members connected with said manifold plate and projecting outwardly of the first side surface of said manifold plate, each of said cylinder members having an inner end portion connected with said manifold plate adjacent to the open end of one of said recesses and an outer end portion, a plurality of pistons, each of said pistons having a head end portion disposed in one of said cylinder members and a rod end portion projecting outwardly of the outer end portion of said one cylinder member, reservoir means disposed within said manifold plate for holding gas and a body of lubricating liquid, said reservoir means including surface means for at least partially defining an elongated chamber which is disposed between the first and second sides of said manifold plate and which extends alongside the plurality of recesses in said manifold plate, first passage means disposed within said manifold plate for conducting a flow of lubricating liquid from said reservoir means to each of said recesses during operation of the press from the closed condition to the open condition, and second passage means disposed within said manifold plate for conducting a flow of gas from said reservoir means to each of said recesses during operation of the press from the closed condition to the open condition.

2. An apparatus as set forth in claim 1 wherein said elongated chamber is disposed within said manifold plate at a location between end surfaces of said recesses and the second side of said manifold plate.

3. An apparatus as set forth in claim 1 wherein said first passage means includes a plurality of tubular members each of which extends between said elongated chamber and one of said recesses.

4. A cushion assembly for use in a press which is operable between open and closed conditions, said cushion assembly comprising a piston and cylinder assembly which defines a variable volume chamber, said piston and cylinder assembly being operable to contract said variable volume chamber against the influence of gas pressure in said variable volume chamber to absorb operating forces during operation of the press from the open condition to the closed condition, said piston and cylinder assembly being operable to expand said variable volume chamber during operation of the press from the closed condition to the open condition, reservoir means for holding gas under pressure and a lubricating liquid, said reservoir means being separate from said variable volume chamber, first passage means for conducting a flow of lubricating liquid from said reservoir means to said variable volume chamber during operation of the pressure from the closed condition to the open condition, second passage means separate from said first passage means for conducting a flow of gas from said reservoir means to said variable volume chamber during operation of the press from the closed condition to the open condition and for conducting a flow of gas and lubricating liquid from said variable volume chamber to said reservoir means during operation of said press from the open condition to the closed condition, said piston and cylinder assembly including a piston having an upwardly facing end surface upon which a body of lubricating liquid accumulates during operation of the press, said second passage means includes a conduit having an open end portion which is disposed adjacent to said upwardly facing end surface of said piston and is at least partially disposed in the body of lubricating liquid during operation of the press from the open condition to the closed condition to enable gas in the piston and cylinder assembly to force lubricating liquid to flow from the body of lubricating liquid to said reservoir means through said second passage means.

5. A cushion assembly as set forth in claim 4 further including restrictor means for restricting a flow of gas from said reservoir means to said variable volume chamber to enable the pressure in said reservoir means to exceed the pressure in said variable volume chamber during operation of the press from the closed condition to the open condition.

6. A method comprising the steps of repetitively operating a press between open and closed conditions, expanding a variable volume chamber in a piston and cylinder assembly during each operation of the press from the closed condition to the open condition, conducting a flow of lubricating liquid along a first flow path to the variable volume chamber during each operation of the press from the closed condition to the open condition to lubricate components of the piston and cylinder assembly, conducting a flow of gas to the variable volume chamber along a second flow path which is separate from the first flow path during each operation of the press from the closed condition to the open condition, conducting a flow of gas from the variable volume chamber along the first flow path during each operation of the press from the open condition to the closed condition, and absorbing operating forces in the press by contracting the variable volume chamber against the influence of gas pressure in the variable volume chamber during each operation of the press from the open condition to the closed condition.

7. A method as set forth in claim 6 further including the step of conducting a flow of gas and lubricating liquid from the variable volume chamber along the second flow path during each operation of the press from the open condition to the closed condition.

8. A method as set forth in claim 6 further including the step of providing a reservoir chamber containing both a body of lubricating liquid and a body of gas, said step of conducting a flow of lubricating liquid along a first flow path includes the step of conducting a flow of lubricating liquid from the body of lubricating liquid in the reservoir chamber, said step of conducting a flow of gas along a second flow path includes the step of conducting a flow of gas from the body of gas in the reservoir chamber.

9. A method as set forth in claim 8 further including the steps of conducting a flow of lubricating liquid and conducting a flow of gas to the reservoir chamber during each operation of the press from the open condition to the closed condition.

10. A method as set forth in claim 6 further including the step of accumulating a small body of lubricating liquid in the variable volume chamber and forcing lubricating liquid to flow from the variable volume chamber during operation of the press from the open condition to the closed condition.

11. A method comprising the steps of repetitively operating a press between open and closed conditions, expanding a variable volume chamber in a piston and cylinder assembly by moving a piston relative to a cylinder during each operation of the press from the closed condition to the open condition, contracting the variable volume chamber in the piston and cylinder assembly by moving the piston relative to the cylinder during each operation of the press from the open condition to the closed condition, said step of contracting the variable volume chamber including the step of moving a small body of lubricating liquid with the piston relative to the cylinder, conducting a flow of lubricating liquid along a first flow path to the variable volume chamber during each operation of the press from the closed condition to the open condition to lubricate components of the piston and cylinder assembly, conducting a flow of gas to the variable volume chamber along a second flow path which is separate from the first flow path during each operation of the press from the closed conditions to the open condition, conducting a flow of lubricating liquid from the variable volume chamber by conducting a flow of lubricating liquid from the small body of lubricating liquid during movement of the small body of lubricating liquid with the piston, and absorbing operating forces in the press by contracting the variable volume chamber against the influence of gas pressure in the variable volume chamber during each operation of the press from the open condition to the closed condition.

12. A method as set forth in claim 11 wherein said step of conducting a flow of lubricating liquid from the variable volume chamber includes conducting the flow of lubricating liquid from the variable volume chamber along the second flow path.

13. A method as set forth in claim 11 further including the step of conducting a flow of gas along the first path from the variable volume chamber during each operation of the press from the open condition to the closed condition.

14. A cushion assembly for use in a press which is operable between open and closed conditions, said cushion assembly comprising a piston and cylinder assembly which defines a variable volume chamber, said piston and cylinder assembly being operable to contract said variable volume chamber against the influence of gas pressure in said variable volume chamber to absorb operating forces during operation of the press from the open condition to the closed condition, said piston and cylinder assembly being operable to expand said variable volume chamber during operation of the press from the closed condition to the open condition, reservoir means for holding gas under pressure and a body of lubricating liquid having an upper surface, said reservoir means being separate from said variable volume chamber, first passage means for conducting a flow of lubricating liquid from below the upper surface of the body of lubricating liquid in said reservoir means along a first flow path to said variable volume chamber during operation of the press from the closed condition to the open condition, second passage means separate from said first passage means for conducting a flow of gas from above the upper surface of the body of lubricating liquid in said reservoir means along a second flow path to said variable volume chamber during operation of the press from the closed condition to the open condition and for conducting a flow of gas and lubricating liquid from said variable volume chamber to said reservoir means during operation of said press from the open condition to the closed condition, said first and second flow paths being spaced apart throughout their length.

15. A cushion assembly as set forth in claim 14 wherein said piston and cylinder assembly includes a piston having an upwardly facing end surface upon which a body of lubricating liquid accumulates during operation of the press, said second passage means includes a conduit having an open end portion which is disposed adjacent to said upwardly facing end surface of said piston and is at least partially disposed in the body of lubricating liquid during operation of the press from the open condition to the closed condition to enable gas in the piston and cylinder assembly to force lubricating liquid to flow from the body of lubricating liquid to said reservoir means through said second passage means.

16. A cushion assembly as set forth in claim 14 further including check valve means for blocking a flow of lubricating liquid from said piston and cylinder assembly to said reservoir means through said first passage means during operation of the press from the open condition to the closed condition.

17. A cushion assembly as set forth in claim 14 further including restrictor means for restricting a flow of gas from said reservoir means to said variable volume chamber to enable the pressure in said reservoir means to exceed the pressure in said variable volume chamber during operation of the press from the closed condition to the open condition.

18. A method comprising the steps of repetitively operating a press between open and closed conditions, moving a piston relative to a cylinder to expand a variable volume chamber during each operation of the press from the closed condition to the open condition, moving the piston relative to the cylinder to contract the variable volume chamber during each operation of the press from the open condition to the closed condition, conducting a flow of lubricating liquid from a reservoir along a first flow path to the variable volume chamber during each operation of the press from the closed condition to the open condition, conducting a flow of gas from the reservoir to the variable volume chamber along a second flow path which is separate from the first flow path during each operation of the press from the closed condition to the open condition, moving a body of lubricating liquid relative to the cylinder with the piston during operation of the press from the open condition to the closed condition, conducting a flow of gas from the variable volume chamber to the reservoir along the second flow path during a first portion of the operation of the press from the open condition to the closed condition, and conducting a flow of lubricating liquid along the second flow path to the reservoir from the body of lubricating liquid moving with the piston during a second portion of the operation of the press from the open condition to the closed condition.

19. A method as set forth in claim 18 wherein said step of conducting a flow of lubricating liquid from the reservoir to the variable volume chamber includes conducting a flow of liquid from beneath the upper surface of a body of lubricating liquid in the reservoir along the first flow path to the variable volume chamber.

20. A method comprising the steps of repetitively operating a press between open and closed conditions, expanding a variable volume chamber in a piston and cylinder assembly during each operation of the press from the closed condition to the open condition, conducting a flow of lubricating liquid along a first flow path from a location beneath the surface of a body of liquid in a reservoir to the variable volume chamber during each operation of the press from the closed condition to the open condition to lubricate components of the piston and cylinder assembly, conducting a flow of gas from a location above the surface of the body of liquid in the reservoir to the variable volume chamber along a second flow path which is separate from the first flow path throughout the length of the second flow path during each operation of the press from the closed condition to the open condition, and absorbing operating forces in the press by contracting the variable volume chamber against the influence of gas pressure in the variable volume chamber during each operation of the press from the open condition to the closed condition.

21. A method as set forth in claim 20 further including the step of conducting a flow of gas and lubricating liquid from the variable volume chamber along the second flow path to a location in the reservoir above the body of liquid during each operation of the press from the open condition to the closed condition.

22. A method as set forth in claim 20 further including the step of conducting a flow of gas from the variable volume chamber along the first flow path during each operation of the press from the open condition to the closed condition.

23. A method as set forth in claim 20 further including the step of accumulating a small body of lubricating liquid in the variable volume chamber and forcing lubricating liquid to flow along the second flow path from the variable volume chamber to the reservoir at a location above the body of liquid in the reservoir during operation of the press from the open condition to the closed condition.

24. A method as set forth in claim 23 wherein the piston and cylinder assembly includes a piston which is movable relative to a cylinder, said step of contracting the variable volume chamber including the step of moving a small body of lubricating liquid with the piston relative to the cylinder, said method further including the step of conducting a flow of lubricating liquid from the small body of lubricating liquid which moves with the piston to the reservoir during movement of the small body of lubricating liquid with the piston.

25. A method comprising the steps of repetitively operating a press between open and closed conditions, and absorbing press operating forces during operation of the press from the open condition to the closed condition, said step of absorbing press operating forces including expanding a variable volume chamber during each operation of the press from the closed condition to the open condition, contracting the variable volume chamber during each operation of the press from the open condition to the closed condition, providing a reservoir chamber which is separate from the variable volume chamber and contains both a body of lubricating liquid and a body of gas, conducting a flow of lubricating liquid from a first inlet location beneath the upper surface of the body of lubricating liquid in the reservoir chamber to the variable volume chamber during operation of the press from the closed condition to the open condition, conducting a flow of gas from a second inlet location disposed in the reservoir chamber above the upper surface of the body of lubricating liquid to the variable volume chamber during operation of the press from the closed condition to the open condition, maintaining the flow of lubricating liquid from the first inlet location separate from the flow of gas from the second inlet location until the lubricating liquid and gas enter the variable volume chamber, and conducting a flow of gas and lubricating liquid from the variable volume chamber to the reservoir chamber during operation of the press from the open condition to the closed condition.

26. A method as set forth in claim 25 wherein said step of absorbing press operating forces further includes the step of accumulating a small body of lubricating liquid in the variable volume chamber and moving the small body of lubricating liquid relative to the press during operation of the press from the open condition to the closed condition, said step of conducting a flow of gas and lubricating liquid from the variable volume chamber to the reservoir chamber including conducting lubricating liquid from the small body of lubricating liquid to the second inlet location in the reservoir chamber while the small body of lubricating liquid is moving relative to the press.

27. A method as set forth in claim 25 wherein said step of conducting a flow of gas and lubricating liquid from the variable volume chamber to the reservoir chamber includes the step of inducing a flow of lubricating liquid from the variable volume chamber to the second inlet location under the influence of gas pressure in the variable volume chamber.

28. A method as set forth in claim 25 wherein said step of expanding the variable volume chamber includes the step of reducing the fluid pressure in the variable volume chamber to a fluid pressure which is less than the fluid pressure in the reservoir chamber, said step of conducting a flow of lubricating liquid from the first inlet location in the reservoir chamber includes the step of inducing liquid to flow from the reservoir chamber to the variable volume chamber under the influence of fluid pressure in the body of gas in the reservoir chamber.

* * * * *